United States Patent [19]

Dollinger

[11] Patent Number: 5,151,309
[45] Date of Patent: Sep. 29, 1992

[54] DIE-CUTTABLE AND DISPENSABLE DEFORMABLE LABELS

[75] Inventor: Susan E. Dollinger, Newark, Ohio

[73] Assignee: The Dow Chemical Company, Midland, Mich.

[21] Appl. No.: 628,796

[22] Filed: Dec. 17, 1990

Related U.S. Application Data

[63] Continuation-in-part of Ser. No. 375,566, Jul. 5, 1989, abandoned.

[51] Int. Cl.$^5$ .................... B32B 7/06; B32B 7/12; B32B 27/32
[52] U.S. Cl. ...................... 428/40; 428/343; 428/354; 428/516; 428/523; 283/81
[58] Field of Search ............ 428/40, 354, 516, 523, 428/343; 283/81

[56] References Cited

U.S. PATENT DOCUMENTS

| | | |
|---|---|---|
| Re. 32,929 | 5/1989 | Ewing . |
| 2,880,898 | 4/1959 | Navikas ................... 215/1 |
| 3,199,701 | 8/1965 | Santelli ................... 215/1 |
| 3,481,812 | 12/1969 | Holb et al. ............. 156/306 |
| 3,589,976 | 6/1971 | Erb ......................... 428/516 |
| 3,790,435 | 2/1975 | Tanba et al. ........... 428/457 |
| 4,235,341 | 11/1980 | Martin et al. .......... 206/601 |
| 4,370,388 | 1/1983 | Mito et al. .............. 428/461 |
| 4,461,793 | 7/1984 | Blok et al. .............. 428/446 |
| 4,474,928 | 10/1984 | Hoenig et al. ......... 428/457 |
| 4,481,262 | 11/1984 | Shida et al. ............ 428/441 |
| 4,532,187 | 7/1985 | Hoenig et al. ......... 428/457 |
| 4,626,455 | 12/1986 | Karabedian ............ 428/517 |
| 4,692,327 | 9/1987 | Takahashi et al. .... 428/458 |
| 4,720,425 | 1/1988 | Hattori et al. . |

OTHER PUBLICATIONS

Defensive Publication Mar. 9, 1971, T884,004, Article by James M. Casey, FLEXcon Co., Inc., Dec., 1988.

*Primary Examiner*—Alexander S. Thomas

[57] ABSTRACT

A film facestock useful for making labels for use on deformable substrates, which labels are die-cuttable and dispensable, the film facestock including a layer of a polymer blend which includes an ethylenic material, a styrenic material, and a compatibilizing material.

27 Claims, 4 Drawing Sheets

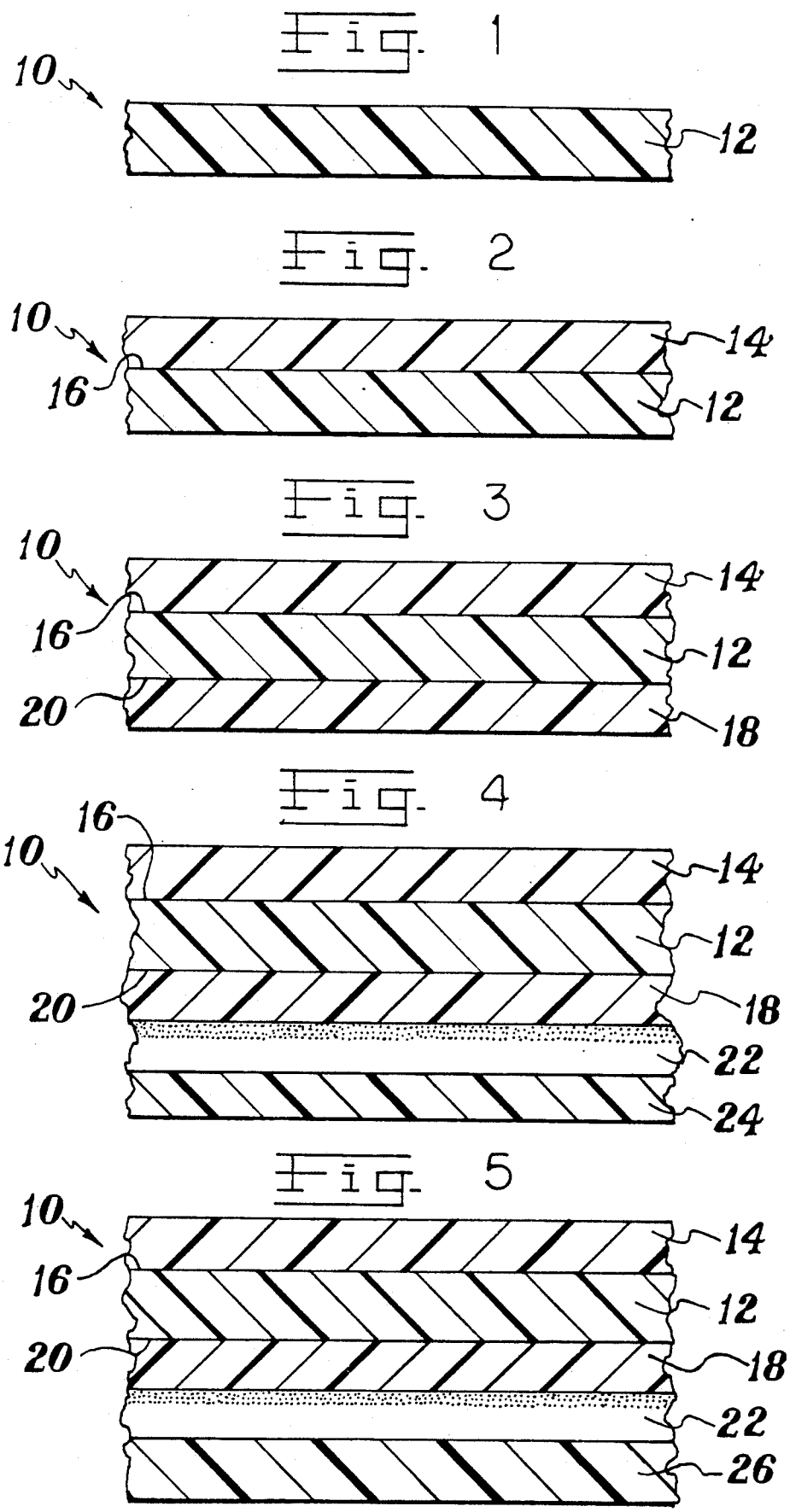

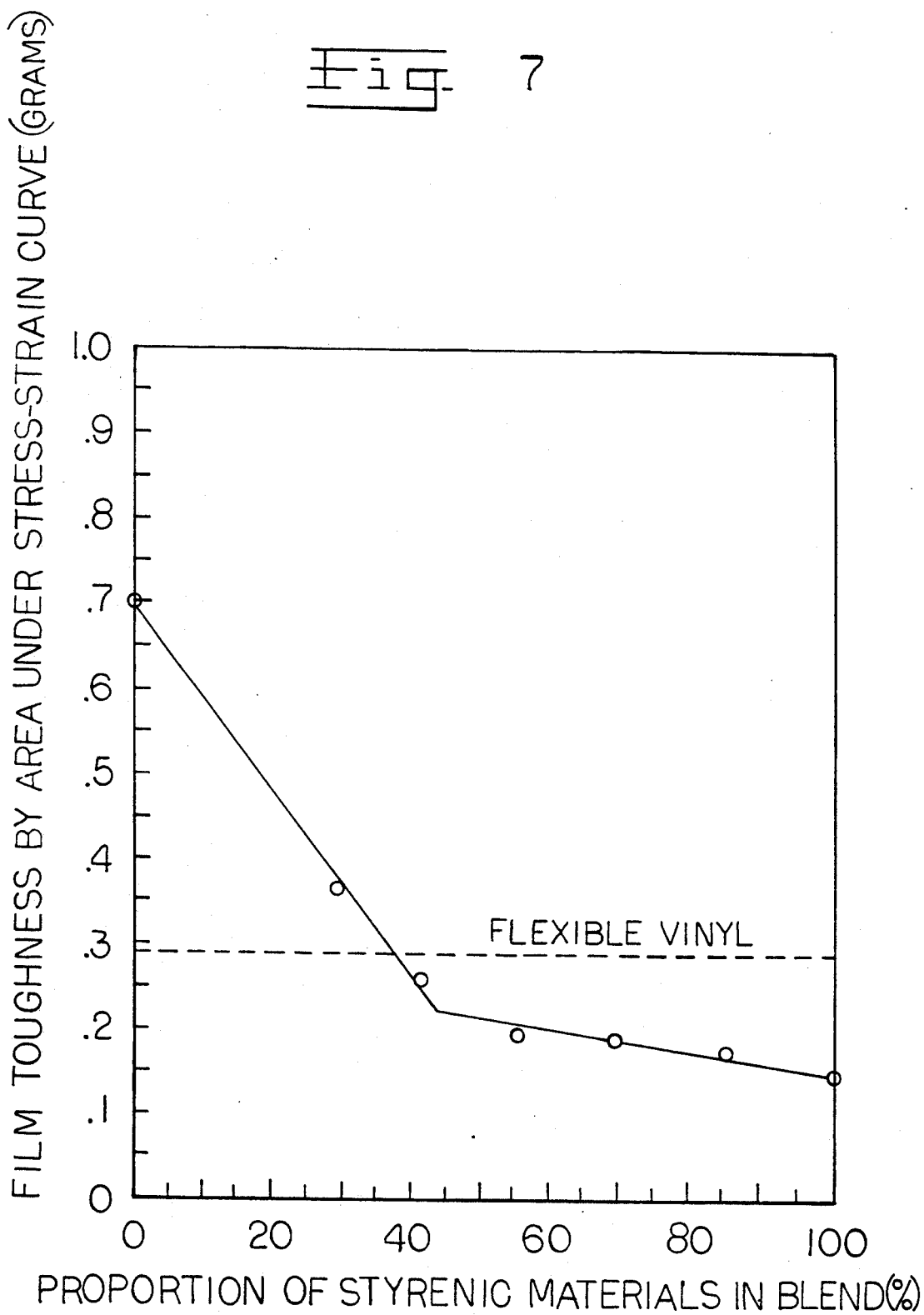

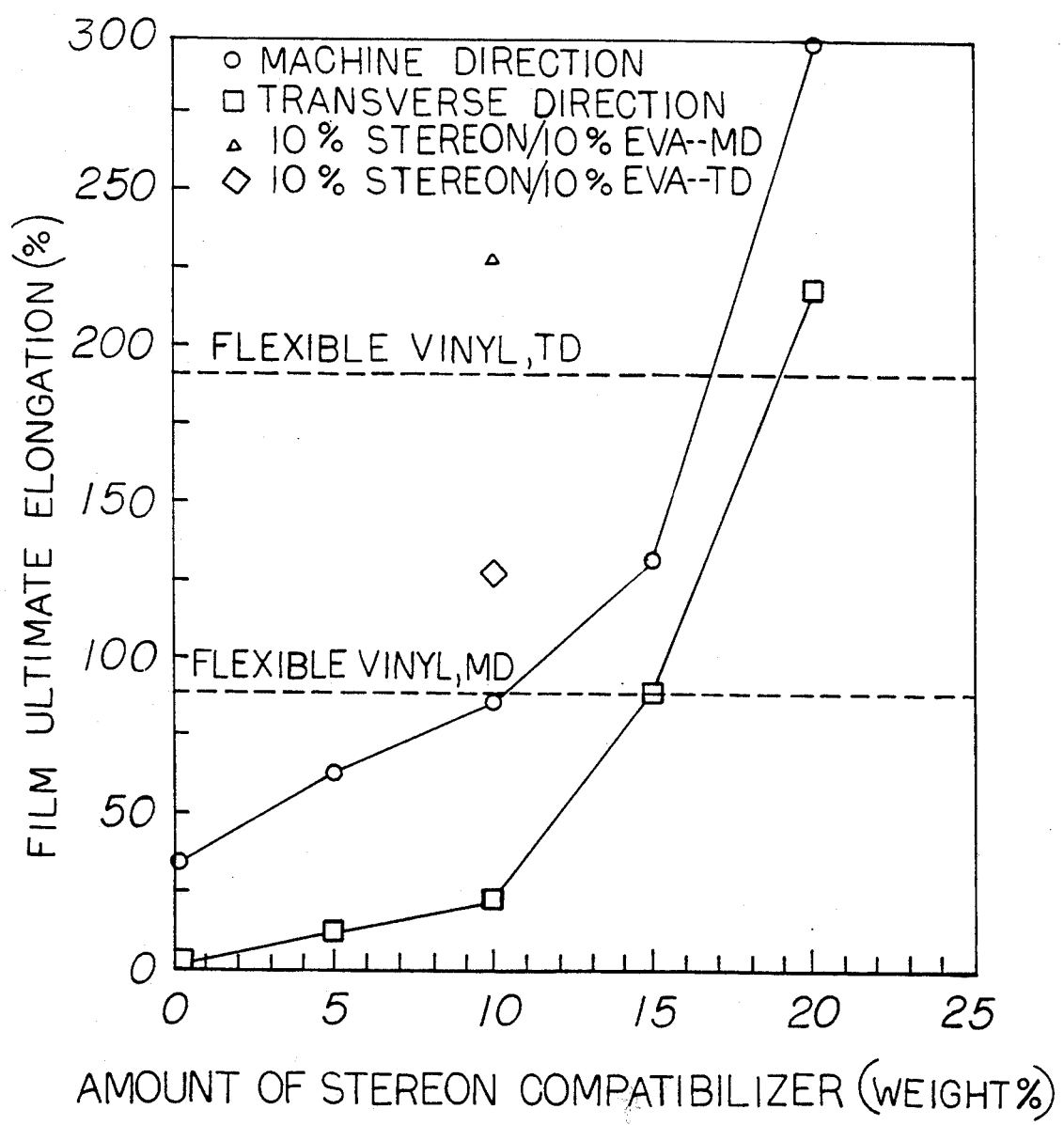

DIE-CUTTABLE AND DISPENSABLE DEFORMABLE LABELS

This application is a continuation-in-part of co-pending application Ser. No. 375,566 filed Jul. 5, 1989 abandoned.

BACKGROUND OF THE INVENTION

1. Field of the Invention

This invention relates to labels generally, and more specifically but without limitation to deformable labels and to films for making such labels. In one aspect the invention relates to the use of such labels on squeezable or otherwise deformable substrates, where deformability and a resistance of the label to damage from cracking, tearing, creasing, wrinkling or shrinking due to deformation of the underlying substrate is desired. In another aspect the invention relates to such labels which possess the beneficial properties of the known polyethylene labels, but which exhibit improved dispensability and die-cuttability so that the labels may be conveniently applied to deformable substrates with modern labeling equipment.

2. Description of the Prior Art

The shortcomings of paper labels with regard to tearing, wrinkling, creasing, and the like due to age and moisture, or due to a lack of deformability when applied to a deformable substrate, have been well documented in the labeling industry. Over the years, a great deal of effort has been devoted to finding acceptable film facestocks which would overcome these shortcomings and demonstrate a resistance to moisture, to tearing, cracking, creasing, wrinkling, shrinking and so forth. More particularly, substantial efforts have been directed also to finding film facestocks which would have these properties when applied to deformable substrates, particularly as squeezable plastic containers and similar items have become more and more popular with consumers of these items.

The film facestocks which have resulted from these efforts and which have been most dominant in the labeling industry to date are calendered plasticized vinyl (i.e., PVC) and biaxially oriented polyester (i.e., PET), with PVC being primarily used for label applications requiring conformability or deformability. Polyester film facestocks have been used predominately where non-squeezability, durability and metallic brilliance are desired end use characteristics.

With particular regard to the vinyl labels which have been primarily used for deformable substrates in prior years, these demonstrate good squeezability or deformability, good die-cuttability, and adequate dispensability, but are limited in terms of their thickness for use with deformable substrates, have dimensional stability problems in hot-filling or other thermal operations, have a shorter shelf life than is desirable for many uses and present problems of compatibility with the migration of those plasticizers and stabilizers which are required to make PVC pliant enough for use with deformable substrates. Vinyl labels are also currently comparatively more expensive than other common label materials such as polyethylene, implicate environmental concerns over the use of chlorinated materials, and are difficult to recycle with deformable polyethylene substrates, for example.

In more recent times, polystyrene, rubber-modified polystyrene, polypropylene and polyethylene film facestocks have been developed. Each of these known film facestocks also possesses at least one significant disadvantage, however. Polystyrene film facestocks are generally stiff and this quality allows for good machine processability in label application equipment, but limits their utility on deformable substrates. Some use of polystyrene facestocks is possible on mildly deformable substrates where selected adhesives are used, but again this use is limited. Polystyrene films also have a comparatively low tear resistance which can be improved somewhat by rubber modification, and do not generally exhibit a desired exterior durability or solvent resistance.

Polypropylene facestocks are generally dimensionally and chemically stable, but possess a combination of tensile, elongation and tear resistance properties which require a higher die pressure for die cutting than is typically required for even polyethylene labels. Polypropylene labels are also generally not as deformable as is desirable for the bulk of deformable label applications.

Polyethylene labels such as are disclosed in U.S. Pat. No. Re. 32,929 to Ewing have come into use on deformable substrates, as suggested in the referenced patent. Polyethylene as a facestock generally possesses dimensional and chemical stability and is deformable. Polyethylene labels are also printable and possess surface characteristics which make the labels amenable to excellent graphic reproduction. Polyethylene as a roll labelstock, however, is difficult to die cut and to dispense from a liner in labeling equipment because of its elongation and yield characteristics. As a result, efforts have been made to strengthen film and film/paper liners to achieve better die strike resistance and a greater serviceability of these liners at the higher die pressures required to die-cut polyethylene face stock. These efforts have not entirely solved the die-cutting problems posed by polyethylene face stock, however, and they do not adequately address the problems posed by polyethylene labels in terms of their dispensability and handling in high speed labeling equipment.

SUMMARY OF THE INVENTION

In considering the shortcomings of the prior art materials, I have discovered that a compatibilized blend of certain styrenic materials and certain ethylenic materials, when used in the proper amounts to produce a film facestock of a given thickness, will provide a label with adequate resistance to cracking, tearing, creasing, wrinkling and shrinking upon deformation of a substrate to which the label is joined, with the printability, chemical and dimensional stability of previously known polyethylene labels while having the desirable die-cuttability and dispensability properties of the vinyl films which have been dominant in the deformable label art to date.

In the blends of the present invention, the styrenic materials provide the stiffness that is generally recognized as necessary for proper dispensing of the label from its liner, and the lower extensibility and toughness needed for good die-cuttability. The ethylenic materials present in the blend provide the conformability or deformability which is required for application and use on a deformable substrate without the problems associated with more conventional paper labels and vinyl labels.

In one aspect a film facestock is provided which has utility for label applications, and which consists of a layer of a polymer blend, the polymer blend including: a first material selected from the group consisting of high impact polystyrene, rubber-modified polystyrene, general purpose polystyrene, and mixtures thereof; a second material selected from the group consisting of linear low, ultra low, low and medium density polyethylenes, copolymers of ethylene and propylene, of ethylene and acrylate monomers, of ethylene and vinyl acetate, and of ethylene and acrylic acid, and mixtures thereof; and a material for compatibilizing the blended first and second materials. The film facestock may also have one or more skin layers held adjacent opposing surfaces of the blend layer.

The term "styrenic materials" as used herein should be taken for purposes of the present invention to refer to the class of materials described above with regard to the first material of the polymer blend layer, and to their equivalents. Similarly, the "ethylenic materials" which have been previously mentioned are considered to be those properly described above as suitable for the second material of the blend layer and their equivalents in the present invention.

In another aspect, a flexible label which is suitable for attachment to a selected substrate is described and comprises a printable film facestock together with an adhesive for affixing the film to the substrate. The film facestock consists of, as just described, a layer of a polymer blend which comprises a first material selected from the styrenic materials and a second material selected from the ethylenic materials, as well as a compatibilizing material. The film facestock may also be provided with skin layers, again as previously described.

The adhesive is selected from the group of materials characterized by the ability to form a bond with the film such that the strength of the film-adhesive interface and the substrate-adhesive interface and the cohesive strength of the adhesive itself are both greater than the forces required for deformation and recovery of the film itself. Simply put, the adhesive selected will be sufficient to enable the label to remain adhered to the substrate during deformation of the label and during recovery from deformation. The flexible label so described also comprises a release-coated liner material which is releasably bonded to the adhesive and thus indirectly to the film itself.

In a final aspect, the present invention provides a flexible label on a deformable substrate, which label comprises a printable film facestock and adhesive as just described.

BRIEF DESCRIPTION OF THE DRAWINGS

FIG. 1 is a cross-sectional view of a film facestock constructed in accordance with the present invention and consisting of a blend layer as previously described;

FIG. 2 is a cross-sectional view of the film facestock of FIG. 1, with a skin layer added;

FIG. 3 is a cross-sectional view of the film facestock of FIG. 1, with skin layers laminated or otherwise held adjacent opposing surfaces of the blend layer of the film;

FIG. 4 is a cross-sectional view of a flexible label of the present invention which is suitable for attachment to a selected substrate;

FIG. 5 is a cross-sectional view of the label shown in FIG. 4, as attached to a given substrate;

FIG. 7 shows the results of testing to determine the proportions of styrenic and ethylenic materials in a blend layer of the film facestocks of the present invention which correspond to certain levels of die cuttability in a given film facestock composition; and FIG. 8 shows a comparison of properties of films prepared according to the present invention and including various amounts of a particular compatibilizing material.

DETAILED DESCRIPTION OF THE PREFERRED EMBODIMENTS

Figure 6:
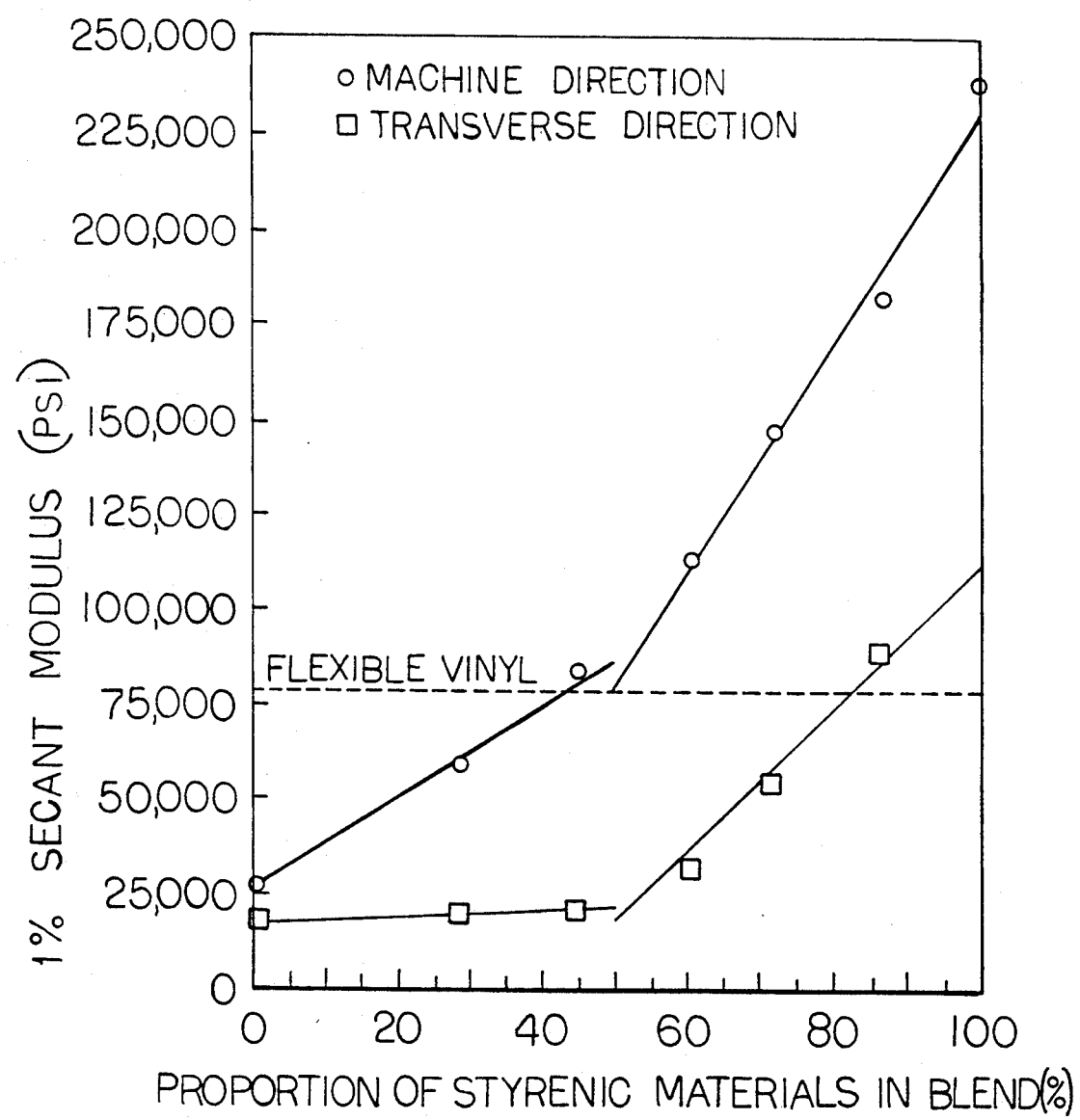
FIG. 6 graphically sets forth the results of testing conducted on films of the present invention to determine the effectiveness of various styrenic material contents in terms of the dispensability of film facestocks having such contents.

Referring now to the accompanying FIGS. 1-8, the present invention is illustrated in its various aspects. FIG. 1 depicts a film facestock 10 which consists of a layer 12 of a polymer blend, the blend including a first material selected from the group consisting of high impact polystyrene, general purpose polystyrene, rubber-modified polystyrene and mixtures thereof, and a second material selected from the group consisting of linear low, ultra low, low and medium density polyethylenes, copolymers of ethylene and propylene, of ethylene and acrylate monomers, of ethylene and vinyl acetate, and of ethylene and acrylic acid, and mixtures thereof, with the polymer blend also including a material to compatibilize the first and second materials.

The polymer blend comprises a substantially homogeneous mixture of the first and second materials and of the compatibilizing material, so that the layer 12 in deformation and recovery behaves as if constructed of a single, uniform material. This relative uniformity of response may be particularly of concern where, as in FIG. 1, the film comprises but the layer 12 and where the placement of the label, the character of the substrate and the use of the substrate demand a uniformity of response.

It should be noted that the polymer blend layer 12 as such may contain other materials in addition to the first and second materials and the compatibilizing material broadly described above, so long as these other materials in the amounts contemplated do not unduly interfere with achieving the desired combination of deformability, die-cuttability and dispensability that is primarily sought to be achieved. As a rule of thumb, the first and second materials together should comprise no less than about 60 percent by weight of the blend layer 12.

For example, a conventional filler and pigment such as titanium dioxide may be added to the blend layer and may be desirable for printing or graphic reproduction purposes. Generally, from an economic viewpoint at least it has not been considered to be of any particular advantage to use more than about 10 percent by weight of titanium dioxide to achieve a white label suitable for printing, although greater amounts could be added for greater opacity so long as there is no undue interference with achieving the desired properties.

As shown in FIG. 2, the film of the present invention may further have a first skin layer 14 held adjacent a first side 16 of the blend layer 12, the layer 14 including in a preferred embodiment materials selected from the group consisting of the olefinic copolymers, polypropylene, general purpose polystyrene, modified polystyrenes and mixtures thereof. The term "modified polystyrenes" shall be taken as referring to rubber-modified and high impact polystyrenes, high styrenic content copolymers such as for example copolymers of styrene with maleic anhydride, with acrylic acid, with methyl methacrylate, with butadiene, or with acrylonitrile as a comonomer, and functionalized or reactive polystyrenes such as an oxazoline-functionalized polystyrene. Other materials may be suitable for the layer 14, but the materials and amounts of such materials selected should not, when incorporated into the first layer 14, prevent the realization of the goals of the present invention in terms of deformability, die-cuttability and dispensability. The first layer 14 may also contain materials such as titanium dioxide and may be held adjacent the first side 16 of the blend layer 12 by any suitable means. Usually the titanium dioxide will be used within the practical limits described above, and will permit the omission of titanium dioxide from blend layer 12.

As for holding the first layer 14 in place, an adhesive may be used, for example, but preferably the first skin layer 14 is formed by melt coextrusion with the blend layer 12. The word "adjacent" is used above to describe the spatial relationship of the layer 14 and the first side 16 of the blend layer 12 and to indicate that intervening layers as of adhesive are contemplated, although as noted, preferably the layer 14 is in a face-to-face relationship with the side 16 of blend layer 12.

An embodiment of the film of the present invention, as shown in FIG. 3, may also employ a second skin layer 18 held adjacent a second side 20 of the blend layer 12 and including a material selected from the group consisting of the olefinic copolymers, polypropylene, general purpose polystyrene, modified polystyrenes and mixtures thereof. As noted with respect to the first skin layer 14 above, the second skin layer 18 may contain additional materials as well, including for example titanium dioxide.

Preferably, however, neither skin layer 14 or 18 contains titanium dioxide, and the titanium dioxide pigment is contained only in the blend layer 12. It has been found in this regard that titanium dioxide tends to build up on a die lip over time where it is not isolated in an inner layer of the film, and eventually breaks off into the film. As a consequence, where the titanium dioxide has not been so isolated, it has been necessary to periodically stop production of the film and remove the materials built up on the die lip. For this reason also, the three-layer embodiment of the film shown in FIG. 3 will generally be preferred over the one- and two-layer embodiments of FIGS. 1 and 2, respectively.

Generally it will be preferred that the first and second skin layers 14 and 18, respectively, be essentially identically constructed and of the same thickness, so that the differences in the behavior of layers 14 and 18 when deformed and when recovering from deformation which are attributable to any differences in composition or thickness do not tend to aid the formation of wrinkles when the film facestock of FIG. 3 is used as part of a label on a deformable substrate. Differences in composition and thickness which do not significantly adversely affect the overall performance of the film in terms of deformability, die-cuttability and dispensability when so used are considered nominal for purposes of the present invention.

In terms of the preferred compositions of the blend layer 12 and of the first and second skin layers 14 and 18, respectively, where these layers are present in the film facestock 10, the first material of blend layer 12 is preferably primarily high impact polystyrene. The preferred high impact polystyrene is a rubber-modified polystyrene produced by a mass polymerization process and having a rubber content of from 5 to 10 percent by weight, a melt flow rate of from 2 to 4 grams per 10 minutes as measured at 200° C. with a 5 kilogram load, and a density at 25° C. of from 1.03 to 1.06 grams/cubic centimeter. High impact polystyrenes produced by other rubber modification processes, involving different rubber types, concentrations or particle sizes are also generally considered suitable.

The second material of blend layer 12 in a preferred embodiment is preferably primarily low density polyethylene. The preferred low density polyethylene has a melt index of from 0.5 to 2 grams/10 minutes as measured at 190 ° C. with a 2.16 kilogram load, and a density at 25° C. of from 0.89 to 0.94 grams per cubic centimeter.

Whether the first and second materials comprise the preferred high impact polystyrene and low density polyethylene or some other of the listed materials, however, it is important that the melt flow properties of the two materials be chosen to allow for good melt blending and homogeneity. It has been found that a high impact polystyrene having a melt flow rate of 3.0 g/10 min and a low density polyethylene having a melt index of 1.1 grams per ten minutes provide a melt blend with good homogeneity, while a low density polyethylene in the same blend of a melt index of 2.0 did not result in good homogeneity. A preferred approach has been to match the viscosity characteristics of proposed resins over the entire shear rate range for coextrusion at temperatures in the range of 190°-200° C.

Because high impact polystyrene and low density polyethylene, for example, are essentially incompatible, the addition of a material to compatibilize blends of the styrenic and ethylenic materials is necessary to achieve a label having the desired performance on deformable substrates. The compatibilizing material preferably is selected from the group consisting of styrene-butadiene block copolymers and ethylene-vinyl acetate copolymers and mixtures thereof. Preferred styrene-butadiene block copolymers are sold by the Firestone Synthetic Rubber and Latex Company. Inc., Akron, Ohio, under the mark Stereon ®, while preferred ethylene-vinyl acetate copolymers are commercially available under the mark Elvax ® from E. I. DuPont de Nemours & Co., Inc., Wilmington, Del. Other styrene-butadiene copolymers which may be preferred for certain applications are sold under the Kraton ® mark by the Shell Chemical Company, Houston, Tex., and possess a different block structure as well as a different styrene-butadiene monomer ratio in the styrene-butadiene copolymer. These other styrene-butadiene copolymers may be desirable where more deformability is required of the label.

The skin layers 14 and 18 are preferably identically composed, as noted earlier, and should in any event comprise not less than about 25 percent by weight of ethylenic materials such as low density polyethylene, nor more than about 40 percent by weight of styrenic materials such as polystyrene. Preferably, the skin layers 14 and 18 will comprise a blend of the high impact polystyrene and low density polyethylene preferred for the blend layer 12 with the preferred styrene-butadiene copolymer compatibilizing material, and most preferably will differ in composition from the blend layer 12 essentially only in the replacement of some of the low density polyethylene in the blend layer 12 with the titanium dioxide pigment.

Where labels of a total film thickness in the range of about 3 to about 4 mils are desired to be made, a polymer blend which has been found suitable for the blend layer 12 of the film component 10 of the label contains from about 10 to about 40 percent by weight of high impact polystyrene having the properties described above, from about 55 to about 25percent by weight of low density polyethylene, about 10 percent by weight of a styrene-butadiene copolymer and an approximately equivalent amount by weight of an ethylene-vinyl acetate copolymer, from about 6 to about 12 percent of titanium dioxide pigment, and from about 4 to about 10 percent by weight of a low density polyethylene as a pigment carrier. To fully realize the benefits and advantages of the present invention, the high impact polystyrene and low density polyethylene (including any low density polyethylene used as a pigment carrier) should comprise no less than about 60 percent by weight of the blend layer 12, as per the rule of thumb set forth above. Furthermore, the weight ratio of the preferred high impact polystyrene to the preferred low density polyethylene in the blend layer 12 of a 3 to 4 mil thick film should most preferably be at least about 40:60, as shown by FIGS. 6 and 7.

This composition achieves in the 3 to 4 mil thick labels a three to four-fold improvement in die-cuttability over polyethylene labels of the same overall thickness, and a two to three-fold improvement in dispensability as measured by the 1 percent secant modulus (machine direction) under ASTM D-882. For labels having an overall thickness outside of the 3-4 mil range and thus perhaps calling for different composition ranges than set forth in the immediately preceding paragraph, the present invention can be seen as providing generally that the preferred amount of styrenic materials incorporated into the blend layer 12 will be such as will enable improvements in the same properties of the same magnitude, compared to polyethylene labels of an equal thickness.

These improvements correspond to substantially achieving the die-cuttability and dispensability characteristics of PVC labels, and thus the present invention should not be considered in a preferred embodiment to be limited to the numerical ranges specified above, but at the least should be taken to encompass combinations of the styrenic and ethylenic materials which enable these improvements in labels of any given thickness.

The blend layer 12 for such a film facestock 10 may, as suggested previously, comprise the entirety of the film, or may preferably comprise an inner layer with adjacent first and/or second skin layers 14 and 18 as described above. The blend layer as the inner or core layer of a three layer film will preferably comprise over 50 percent of the overall thickness of the three layer film, and most preferably from about 70 to 80 percent of the overall thickness.

In designing a film for use with a substrate of a particular character and for a particular application, usually it will be preferable to initially keep the relative and overall thicknesses set and vary the composition of the blend layer 12 first, then the skin layers 14 and 18. The composition of the blend layer 12 may be varied by substituting for the high impact polystyrene which is preferred for the first material of the blend from the list of other available styrenic materials as necessary and as dictated by end-use or cost considerations, or by substituting for the low density polyethylene preferred for the second material, or most preferably only changing the ratio of the preferred high impact polystyrene and low density polyethylene within the blend layer 12.

It has been found that for deformable substrates constructed of low density, medium density, and high density polyethylenes that sufficient improvements in deformability to accommodate increasingly deformable substrates can be accomplished merely by changing the styrenic materials to ethylenic materials ratio. The effects of such a change on the dispensability and die cuttability of labels having various proportions of certain styrenic materials (namely, general purpose polystyrene and high impact polystyrene)are shown in FIGS. 6 and 7. Because the deformability, dispensability and die cuttability of such labels are each of concern in the present invention, the best approach contemplated for changing the composition of the blend layer 12 is to select a proportion of these materials which will give a die cuttability and dispensability approaching that of vinyl films, and test the deformability and suitability for a given substrate. If the resulting label is not sufficiently deformable, another proportion is selected if possible which does not involve a significant sacrifice in dispensability and die cuttability properties. If this is not possible, a different combination of ethylenic and styrenic materials or a modification of the skin layers 14 and 18 may then be appropriate.

It has also been found that, within the composition parameters set forth above with respect to the preferred high impact polystyrene and low density polyethylene, a three-layer ABA-type construction is approximately equivalent to a single blend layer construction where the skin layers "A" each comprise approximately 15 percent by volume of the label construction, at least in terms of the deformability, dispensability and die-cuttability characteristics of the label and for low density, medium density, and high density polyethylene substrates.

The range of adjustments which can be made by varying the composition of the layer or layers, either by changing the relative amounts of components in the blend or skin layers or by the substitution of various materials within these layers, is fairly substantial, but it is suggested that in accordance with my findings initially the ratio of the preferred high impact polystyrene and low density polyethylene be varied to achieve a different mix of properties.

Where this technique does not achieve an optimal combination of die-cuttability, dispensability and deformability properties, though, a partial or complete substitution of alternative materials for the preferred high impact polystyrene and low density polyethylene of the blend layer may be undertaken, as well as a variation in the relative and overall thicknesses of the blend and skin layers.

As for the other materials which can be utilized for the first and second materials of the polymer blend layer, it is considered that for the first material a general purpose polystyrene will be desirable when greater dispensability is needed, or that medium density polyethylene will be used for the second material for an improvement in dispensability also.

A partial or complete substitution of ultra low or linear low density polyethylene for the low density polyethylene presently preferred for the second material of the polymer blend layer is believed to be appropriate, for example, where improved toughness and better matrix stripping is sought. The ethylenic copolymers which may comprise the second material of the blend layer will generally be used where enhanced polarity or surface tension is desired, as where improved printability is a consideration.

Although emphasis has been placed on varying the composition of the blend layer in achieving an optimal blend of properties for a particular application, it should be specifically noted that variations in the compositions of the skin layers 14 and 18 or conceivably too the addition of certain fillers to the blend or skin layers may also be used to alter the properties of a film for a given end use. Given the variety of potential end uses for the film facestocks and labels of the present invention, it is not possible to fully anticipate when such variations and fillers would be desirable, however, particularly since variations in the composition of the blend layer 12 have thus far proved adequate. The choice of when to employ such variations and fillers is believed to be a matter within the competence of a person of ordinary skill in the art given the present disclosure.

Further, it is not suggested by the foregoing that other methods for achieving a film 10 of the present invention having the desired properties for a particular application at the lowest manufacturing cost or with the greatest ease of processing and flexibility may not be adopted. It is submitted, however, that the method and general guidance which have been provided above will, in combination with the examples to follow. enable one of ordinary skill in the art to practice the present invention and realize the benefits and advantages thereof.

Referring now to FIG. 4, a flexible label which is suitable for attachment to a selected substrate is shown, and comprises a printable three-layer film facestock 10 of the present invention as described above together with an adhesive 22 which is usefully dispersed for affixing the film 10 to the substrate, and a release-coated liner material 24 releasably bonded to the adhesive 22. The printable film facestock 10 when used as in FIG. 4 may omit the skin layers 14 and 18, as previously noted, and consist only of a polymer blend layer 12.

The release-coated liner material 24 may be any suitable conventionally known liner material for labeling applications, but those liner materials which are preferred for purposes of the present invention include silicone-coated paper, polypropylene, and polyester (FET).

The adhesive 22 is selected from the group of materials characterized by the ability to form a bond with the film such that the strength of the film-adhesive interface and the substrate-adhesive interface and the cohesive strength of the adhesive 22 itself are both greater than the forces required for deformation and recovery of the film itself. These materials are essentially those adhesives 22 having the ability to cure to a high level of adhesion and cohesive strength, such that the label functions in the manner of an extension of the substrate surface, deforming and recovering with the flexing substrate, and such that the adhesive 22 in a given system does not itself rupture during this flexing but maintains the integrity of the system.

It should be clear that it is not necessary that the adhesive function so in perpetuity, but the adhesive should preferably be sufficient to enable the label to accomplish its intended purpose for the reasonable lifetime of a deformable container when in such use. The adhesive may or may not comprise a discrete and substantially continuous layer as shown in FIG. 4, and can be manually or mechanically applied to the film 10.

Adhesives 22 which are deemed preferable but not indispensable for the practice of the present invention are pressure-sensitive and include the acrylic and styrene-butadiene adhesives, although any adhesive meeting the general criteria provided may be employed in the present invention.

The film 10 of FIG. 1, shown adhered to a release-coated liner 24 in FIG. 4, is suitably peeled away from, or dispensed from the liner 24 and adhered to a flexible or deformable substrate 26 as in the structure of FIG. 5. The film 10 and adhesive 22 are as previously described, and the deformable substrate 26 preferably comprises low density polyethylene, medium density polyethylene, or high density polyethylene, although within the parameters of the present invention as earlier set forth suitable labels may be prepared for other substrate materials as well, including paper and thin metal structures, for example. The label is preferably structured and comprised of such materials so that the label demonstrates the improved resistance to damage from cracking, tearing, creasing, wrinkling or shrinking due to deformation of the substrate 26 in use which is sought by the present invention.

At the same time, however, the label shown in FIG. 2 should have enhanced die-cuttability and dispensability. These attributes may be attained in accordance with the teachings above and the examples which follow.

EXAMPLE 1

A pressure-sensitive label system was constructed in this Example by blending in the melt phase the following materials to form a white 3.6 mil thick single layer film consisting of a blend layer containing, by weight:

a) 36 percent of a Styron © rubber-modified high impact polystyrene having a rubber content of 7 percent by weight, a melt flow rate of 3 grams per 10 minutes as measured at 200° C. under a 5 kg load, and a density of 1.05 grams per cubic centimeter;
b) 32 percent of a low density polyethylene having a melt index of 1.1 grams per 10 minutes at 190° C. under a 2.16 kg load;
c) 10 percent of a Stereon © 841A styrene-butadiene block copolymer having a melt flow rate of 12 grams per 10 minutes at 200° C. under a 5 kg load, and a styrene content of 43 percent by weight;
d) 10 percent of Elvax © ethylene-vinyl acetate copolymer, having a melt index of 6 grams per 10 minutes at 190° C. under a 2.16 kg load and a vinyl acetate content of 2.80 percent by weight; and
e) 12 percent of Folycom Huntsman D13400 white pigment concentrate, containing equal amounts by weight of titanium dioxide and low density polyethylene as a pigment carrier.

The film was subjected to physical property testing to determine its yield, surface tension, yield tensile strength, ultimate tensile strength, ultimate elongation, 1 percent secant modulus, Spencer impact strength, Elmendorf tear strength, and die cuttability. The results are shown in Table I.

TABLE I

| Property | | Average of Test Results, Five Samples |
|---|---|---|
| Yield (in²/lb) | | 7,590 |
| Surface Tension (dynes/cm) | | 55 |
| Yield Tensile Strength (psi) | MD | 1,240 |
| | TD | 870 |
| Ultimate Tensile Strength (psi) | MD | 2,450 |
| | TD | 1,890 |

TABLE I-continued

| Property | | Average of Test Results, Five Samples |
|---|---|---|
| Ultimate Elongation (%) | MD | 154 |
| | TD | 220 |
| 1% Secant Modulus (psi) | MD | 51,090 |
| | TD | 29,900 |
| Spencer Impact Strength (g/mil) | | 495 |
| Elmendorf Tear Strength (g/mil) | MD | 17 |
| | TD | 22 |
| Die Cuttability (grams) | MD | 0.168 |
| | TD | 0.176 |

MD = Machine Direction
TD = Transverse Direction

Samples of the film were then coated with an acrylic transfer adhesive, and the resulting labels were cured in a forced air oven at 160° F. for 1 hour. The labels were hand applied to 8 ounce flame-treated high density polyethylene bottles, with the labled bottles being cured at 160° F. for an additional 3 hours. The labeled bottles were then squeezed and flexed 30 times, each time to one-half of their original diameter, with the bottles being rotated one-quarter turn after each squeezing action. The bottles exhibited no cracking and good resistance to wrinkling, although some wrinkling did occur in some of the samples tested.

Other film samples were coated with a pressure sensitive adhesive, cured and machine applied to a round sample bottle, run through one dishwasher cycle with no soap present and then subjected to squeeze testing. For the squeeze testing of this particular group of labels, each bottle was filled with Prell® shampoo and squeezed 200 times until the bottle was emptied. No bubbling, cracking or wrinkling was apparent on bottles emerging from the dishwasher, and the labels subjected to squeeze testing subsequently showed no changes from their condition leaving the dishwasher.

The reader will note in the remaining examples that the pigment carrier used in those examples, namely a general purpose polystyrene, was replaced in this Example by a low density polyethylene. Because the labels in each of the remaining examples did exhibit some slight wrinkling at least, it was thought that perhaps the general purpose polystyrene, even though present in relatively small amounts, rendered the labels too stiff. Additionally, the general purpose polystyrene was different from the other materials used and gave rise to unnecessary complications in blending, so the decision was made to use a low density polyethylene as a pigment carrier instead for the present Example.

As noted above, however, wrinkling was still detected in some of the hand-applied labels using low density polyethylene as a pigment carrier, but was not detected in labels which were applied by machine. This observation suggests that the wrinkling seen in subsequent examples may not be due to the presence of general purpose polystyrene as a pigment carrier, but rather to the trapping of air in applying the labels of those examples by hand, for instance. None of the labels generated in those examples were actually tested with labeling equipment as in this Example, so it is not known for certain whether the same wrinkles would show up or disappear in machine-applied labels constructed as in later examples. For present purposes, however, low density polyethylene is preferred as a pigment carrier in view of the results of testing conducted in this Example and to eliminate any blending concerns.

The reader should also consider that the films of this Example only used a blown film process, whereas subsequent examples used a cast film process. This distinction will explain the disparity in physical properties in the transverse direction of films made according to this and subsequent examples.

EXAMPLE 2

A pressure-sensitive label system was constructed as in Example 1, except that a 3.5 mil thick film was prepared having 40 percent of the low density polyethylene of Example 1 and 25 percent of the high impact polystyrene of Example 1, with 10 percent by weight of each of the Elvax® 3175 and Stereon® 841A copolymers, 9 percent of titanium dioxide pigment and 6 percent of a general purpose polystyrene as a pigment carrier.

The film was coated with an acrylic transfer adhesive, and the labels prepared from the film were allowed to cure in a forced air oven at 160° F. for 1 hour. The labels were hand applied to 8 ounce flame-treated high density polyethylene bottles, then the bottles were allowed to cure at 160° F. for an additional 3 hours. Afterwards, the labeled bottles were subjected to dishwasher, shower and freezer conditions, then squeezed and flexed 30 times, each time to ½ of their original diameter, with the bottles being rotated ¼ turn after each squeezing action. The bottles exhibited no cracking and fairly good resistance to wrinkling.

EXAMPLE 3

A pressure-sensitive label system was constructed according to this invention by blending in the melt phase the following materials to form a white 3.5 mil thick film consisting of a homogeneous polymer blend layer containing, by weight:
a) 45 percent of the Styron® rubber-modified high impact polystyrene of Examples 1 and 2;
b) 20 percent of the low density polyethylene of Examples 1 and 2;
c) 10 percent of the Elvax® 3175ethylene-vinyl acetate copolymer;
d) 10 percent of the Stereon® 841A styrene-butadiene block copolymer;
e) 9 percent of titanium dioxide pigment; and
f) 6 percent of a general purpose polystyrene.

The film was coated with adhesive, cured, and hand applied to high density polyethylene bottles for curing, as in Example 2. Testing of the bottles according to the procedures followed in Example 2 indicated no cracking but only marginal resistance to wrinkling.

EXAMPLE 4

This example utilized a 3-layer ABA-type film construction to form labels which were treated and tested as in Examples 2 and 3. Each skin or "A" layer contained 92.5percent by weight of the low density polyethylene of Examples 1, 2 and 3 and 7.5 percent by weight of titanium dioxide, with each skin layer constituting 15 percent by volume of the 3-layer film. The "B" or polymer blend layer had the same composition as described in Example 2 above. High density polyethylene bottles bearing the 3-layer labels gave results which were judged to be essentially equivalent to those of Example 2.

COMPARISONS 1 AND 2

This example compares the ultimate elongation, modulus tear strength, and toughness of films prepared as in Examples 2-4, of a 3 mil thick low density polyethylene film, of a 3 mil thick white styrenic film composed of 80 percent by weight of Styron ® high impact polystyrene, 12 percent titanium dioxide and 8 percent general purpose polystyrene, and of a 3.6 mil thick flexible vinyl label. The ultimate elongation and energy to break of each film in the machine and transverse directions (MD and TD, respectively) was determined according to ASTM D-882, while Elmendorf tear strength was measured according to ASTM D-1922. Results of these tests may be found in Table 11.

TABLE II

| | Data reported as MD/TD | | | |
|---|---|---|---|---|
| Sample | Ultimate Elongation (%) | Tear Strength (grams/mil) | Film Toughness (in-lb) | 1% Secant Modulus (psi) |
| Flexible vinyl (Comp. 1) | 103/190 | 22/27 | 25/48 | 70000/79000 |
| Styrenic film (Comp. 2) | 48/32 | 4/6 | 7/8 | 278700/286130 |
| HIPS/LDPE (Example 3) | 145/51 | 7/19 | 22/5 | 142070/56500 |
| HIPS/LDPE (Example 2) | 166/191 | 10/33 | 25/16 | 85290/21320 |
| Multilayer ABA LDPE skins HIPS/LDPE blend core (Example 4) | 195/184 | 12/33 | — | 53000/27530 |
| LDPE | 640/800 | 47/116 | 78/90 | 35000/38000 |

EXAMPLE 5

This example compares the properties of 3 to 4 mil thick films employing the single layer construction of the present invention to those of 3.6 mil thick vinyl films, and to those of films having a 5-layer construction of low density polyethylene/ethylene-vinyl acetate/high impact polystyrene/ethylene-vinyl acetate/low density polyethylene, the ethylene-vinyl acetate copolymer being used in this construction as an adhesive between the layers of low density polyethylene and high impact polystyrene. The 5-layer film tested contained 50 percent low density polyethylene overall by weight (25 percent per skin layer), 30 percent by weight of the core high impact polystyrene layer, and 20 percent by weight consisted of the ethylene-vinyl acetate copolymer adhesive. The blend layer of the film of the present invention contained 40 percent by weight of a low density polyethylene, 25 percent by weight of a high impact polystyrene, 6 percent by weight of general purpose polystyrene, 10 percent by weight of an ethylene-vinyl acetate copolymer, 10 percent by weight of a styrene-butadiene copolymer, and 9 percent by weight of titanium dioxide.

Measurements in the machine and transverse directions were taken with respect to the 1 percent secant modulus of each film, the yield and ultimate tensile strengths of each and the ultimate elongation of each according to ASTM D-882 and the Elmendorf tear strength of each film (ASTM D-1922), and the die-cuttability and Spencer impact strength of each.

The die-cuttability of the films was measured by the weight of the chart paper comprising the area under the tensile load-elongation curve at conditions of 130 mm per minute crosshead and chart speeds, a 1 inch jaw span and 50 pounds full scale load on an Instron tensile tester.

The Spencer impact strength was measured as in Example 1, by fitting an Elmendorf tear tester with a Spencer impact attachment and testing film samples according to a method similar to ASTM D-3420. The results of these various tests are provided in Table III which follows.

TABLE III

Comparison of Blend Layer Films of Present Invention Vinyl and Multilayer PE/PS Films of Like Thickness

| Property | | Multilayer PE/PS Films | PE/PS Blends | Flexible Vinyl Films |
|---|---|---|---|---|
| 1% Secant Modulus (psi) | MD | 86,312 | 85,290 | 70,000 |
| | TD | 79,752 | 21,320 | 79,000 |
| Yield Tensile Strength (psi) | MD | 2,167 | 1,390 | 3,300 |
| | TD | 1,516 | 950 | 3,000 |
| Ultimate Tensile Strength (psi) | MD | 2,598 | 3,120 | 4,100 |
| | TD | 1,926 | 1,400 | 3,100 |
| Ultimate Elongation (%) | MD | 156 | 166 | 100 |
| | TD | 29 | 190 | 190 |
| Elmendorf Tear Strength* (grams/mil) | MD | 22 (r) | 10 (s) | 22 (s) |
| | TD | 24 (r) | 30 (s) | 27 (s) |
| Spencer Impact Strength (grams/mil) | | 236 | 585 | 550 |
| Die-Cuttability (grams) | | 0.108 | 0.350 | 0.325 |

* (r) indicates ragged tear. (s) indicates smooth tear

Upon application to high density polyethylene bottles and subsequent testing in accordance with the procedures established in Examples 2, 3 and 4, the labels including the multilayer films were observed to wrinkle, whereas the labels including the single layer film of the present invention again gave fairly good resistance to wrinkling.

Examples 6 and 7 offer a comparison of properties obtained when linear low density polyethylene is substituted for varying amounts of low density polyethylene within the blend layers of films constructed according to the present invention.

EXAMPLE 6

In this Example, films consisting of a blend layer of the present invention were constructed using 68 percent by weight of a high impact polystyrene, 10 percent by weight of a Stereon ® styrene-butadiene copolymer, and 22 percent by weight of low density polyethylene on the one hand, and Dowlex ® 2047 linear low density polyethylene on the other. Tests were conducted according to ASTM D-882 to determine the 1 percent secant modulus, yield tensile strength, ultimate tensile strength and ultimate elongation of these films, and the Spencer impact strength of each film so constructed was determined according to the test procedure explained in Example 5.

The results of these tests are shown in Table IV as follows, where MD and TD are again understood to represent "machine direction" and "transverse direction", respectively.

TABLE IV

Comparison of LDPE Versus LLDPE as Ethylenic Material Composition:
68% HIPS + 22% PE + 10% Stereon ® Copolymer

| Property | | LDPE | LLDPE |
|---|---|---|---|
| 1% Secant | MD | 170,260 | 190,221 |

TABLE IV-continued

Comparison of LDPE Versus LLDPE as Ethylenic Material
Composition:
68% HIPS + 22% PE + 10% Stereon ® Copolymer

| Property | | LDPE | LLDPE |
|---|---|---|---|
| Modulus (psi) | TD | 105,000 | 120,180 |
| Yield Tensile | MD | 3,350 | 3,820 |
| Strength (psi) | TD | 1,560 | 1,920 |
| Ultimate Tensile | MD | 4,760 | 4,890 |
| Strength (psi) | TD | 2,100 | 2,860 |
| Ultimate | MD | 103 | 154 |
| Elongation (%) | TD | 40 | 149 |
| Spencer Impact | | 736 | 662 |
| Strength (grams/mil) | | | |

*Stereon is a trademark of Firestone Synthetic Rubber & Latex Company, Akron, Ohio

EXAMPLE 7

In this example, single layer films were constructed of polymer blends including 22 percent by weight of a preferred high impact polystyrene, 10 percent by weight of a Stereon ® styrene-butadiene copolymer, and 68 percent by weight of the same low density and linear low density polyethylene as used in Example 6. The identical tests were conducted as in Example 6 and the results are reported in Table V below.

TABLE V

Comparison of LDPE Versus LLDPE as Ethylenic Material
Composition:
22% HIPS + 68% PE + 10% Stereon ® Copolymers

| Property | | LDPE | LLDPE |
|---|---|---|---|
| 1% Secant | MD | 69,775 | 75,875 |
| Modulus (psi) | TD | 25,830 | 21,280 |
| Yield Tensile | MD | 1,360 | 1,560 |
| Strength (psi) | TD | 940 | 940 |
| Ultimate Tensile | MD | 4,160 | 3,650 |
| Strength (psi) | TD | 1,350 | 2,810 |
| Ultimate | MD | 136 | 600 |
| Elongation (%) | TD | 289 | 760 |
| Spencer Impact Strength (grams/mil) | | 980 | 722 |

EXAMPLE 8

Example 8 shows the effects on film properties relating to dispensability, deformability and die-cuttability of substituting Attane ® 4001 ultra low density polyethylene for varying equivalent amounts by weight of low density polyethylene within a single layer film construction of the present invention.

In this example, films were prepared from blends which comprised 10 percent by weight of Stereon ® styrene-butadiene copolymers, 10 percent by weight of Elvax ® ethylene-vinyl acetate copolymers (EVA), 9 percent of titanium dioxide, 6 percent of general purpose polystyrene (GPPS), and 10 percent, 20 percent, and 30 percent by weight of low density or ultra low density polyethylene, with the balance comprising the preferred high impact polystyrene. Tests were conducted to determine the 1 percent Secant modulus, yield and ultimate tensile strengths, ultimate elongation, and Spencer impact and Elmendorf tear strengths by previously disclosed test methods. Results of the tests for the various films are presented in Table VI.

TABLE VI

Physical Properties of HIPS/PE Blends
Comparison of LDPE Versus ULDPE as Ethylenic Material
Composition: (65-X)% HIPS + X% LDPE or ULDPE + 10% Stereon ®
Copolymer + 10% EVA + 9% TIO2 + 6% GPPS

| Property | X = | 10% LDPE | 10% ULDPE | 20% LDPE | 20% ULDPE | 30% LDPE | 30% ULDPE |
|---|---|---|---|---|---|---|---|
| 1% Secant | MD | 169,375 | 176,137 | 142.071 | 133,019 | 106,498 | 100,491 |
| Modulus (psi) | TD | 88,250 | 86,918 | 56,500 | 48,407 | 35,976 | 24,816 |
| Yield Tensile | MD | 3,295 | 3,570 | 2,369 | 2,461 | 1,974 | 1,772 |
| Strength (psi) | TD | 1,444 | 1,645 | 1,303 | 1,319 | 1,021 | 930 |
| Ultimate Tensile | MD | 4,080 | 4,544 | 3,473 | 3,787 | 3,440 | 3,429 |
| Strength (psi) | TD | 1,610 | 2,085 | 1,588 | 2,233 | 1,428 | 2,256 |
| Ultimate | MD | 112 | 134 | 145 | 191 | 167 | 291 |
| Elongation (%) | TD | 15 | 100 | 51 | 248 | 75 | 404 |
| Elmendorf Tear | MD | 5 | 11 | 7 | 13 | 10 | 25 |
| Strength (g/mil) | TD | 20 | 21 | 19 | 26 | 21 | 50 |
| Spencer Impact Strength (g/mil) | | 51 | 566 | 578 | 580 | 679 | 643 |

EXAMPLE 9

This example shows the effect of using equal amounts by weight of styrene-butadiene block copolymers of different monomer ratios and block structures as a compatibilizing material within blend layers of films or labels of the present invention. These styrene-butadiene copolymers of different styrene-butadiene monomer ratios are currently sold under the trademarks Stereon ® and Kraton ® by the Firestone Synthetic Rubber & Latex Company, Akron, Ohio, and the Shell Chemical Company, Houston, Tex. and correspond to styrene-butadiene monomer ratios of about 43:66 and about 28:72 respectively. The composition of the blend layers is as set forth in Table VII with results of tests conducted according to earlier documented methods included therein also.

TABLE VII

Comparison of Stereon ® Versus Kraton ® Styrene-Butadiene
Block Copolymer Compatibilizing Materials
Composition:
55% HIPS + 10% LDPE + 10% Styrene-Butadiene
Block Copolymer + 10% EVA + 9% TIO2 + 6% GPPS

| Property | | Stereon ® 841A | Kraton ® D1102 |
|---|---|---|---|
| 1% Secant | MD | 153,360 | 146,220 |
| Modulus (psi) | TD | 76,630 | 67,060 |
| Yield Tensile | MD | 2,943 | 2,860 |
| Strength (psi) | TD | 1,526 | 1,470 |
| Ultimate Tensile | MD | 4,160 | 3,650 |
| Strength (psi) | TD | 1,780 | 1,850 |
| Ultimate | MD | 175 | 135 |
| Elongation (%) | TD | 91 | 98 |
| Elmendorf Tear | MD | 14 | 9 |
| Strength (g/mil) | TD | 30 | 20 |
| Spencer Impact Strength (g/mil) | | 629 | 535 |

EXAMPLE 10

In FIG. 6 are set forth the results of testing conducted on films of the present invention having various styrenic material contents to determine the 1 percent Secant modulus associated with those contents, for films having 10 percent by weight Stereon ® copolymers, 10 percent by weight of Elvax ® ethylene-vinyl acetate copolymers, 9 percent by weight of titanium dioxide, and 6 percent by weight of general purpose polystyrene, with the balance being low density polyethylene and high impact polystyrene. Testing and preparation of the films was accomplished as in previous examples, and a typical value for flexible vinyl films is given for comparison. In analyzing the information contained in FIGS. 6 and 7, the reader should note that the general purpose polystyrene which is present as a carrier for the pigment has been included in determining the amount of styrenic materials present in the blend.

EXAMPLE 11

FIG. 7 graphically presents the results of tests run to determine the die-cuttability of films prepared as taught by the present invention and comprising 10 percent by weight of Stereon ® styrene-butadiene block copolymers, 10 percent by weight of Elvax ® ethylene-vinyl acetate copolymers, 9 percent titanium dioxide, and 6 percent general purpose polystyrene, with the remainder comprising low density polyethylene and high impact polystyrene in varying amounts. Again a typical value for vinyl films is given for purposes of comparison.

EXAMPLE 12

In FIG. 8, the effects are demonstrated of using various amounts of the Stereon ® styrene-butadiene copolymer compatibilizing material on the extensibility of films made according to the present invention and comprising in a blend layer 9 percent by weight of titanium dioxide, 6 percent by weight of general purpose polystyrene as a pigment carrier, and a given amount of the Stereon ® copolymeric compatibilizing material, with the balance comprising the preferred high impact polystyrene and low density polyethylene in the ratio of 56 parts low density polyethylene to 44 parts by weight of high impact polystyrene. Ultimate elongation in both the machine and transverse directions of such films is shown, as are the values associated with a film including equal measures of the Elvax ® and Stereon ® materials (10 percent by weight of each) and with flexible vinyl films.

It is well known in the labeling industry that dispensability is related to the machine direction value particularly of the 1 percent secant modulus of a film, and that the die cuttability of a film is roughly proportional in some way to the product of the ultimate elongation and ultimate tensile strength of a film or to the toughness of a film, and is dependent on both the machine and transverse values of these properties. Considering the examples above, it can be seen that the labels made from the compositions of the present invention realize improvements in die-cuttability and dispensability over polyethylene labels generally while retaining excellent deformability, and are otherwise suited to overcome the shortcomings of the prior art.

Looking specifically at the results shown in Tables I-VII and in FIGS. 6-8, from Table II it can be generally concluded that the films of the present invention are more die-cuttable than polyethylene labels, but are considerably less stiff than the styrenic films used and are comparable to vinyl labels. Table III shows that the blend layer films of the present invention are comparable to vinyl films in terms of die cuttability, and compare generally favorably to a laminate of discrete polyethylene and polystyrene layers as to these properties.

Tables IV and V show the improvement in extensibility properties when LLDFE is substituted for LDPE as the ethylenic material. Such higher extensibility and thus improved toughness may allow for improved label matrix stripping capabilities.

Table VI indicates that increasing the proportion of LDPE in the blend provides lower modulus and higher extensibility properties in the film. Increased levels of LDFE are beneficial to the conformability and matrix stripping characteristics, while increased HIFS levels are beneficial to the dispensability and die cutting properties. Also, from Table VI it can be concluded that upon substitution of ULDPE for LDPE as the ethylenic material, lower film modulus and higher extensibility are observed, which would similarly provide for improved conformability and matrix stripping characteristics.

Table VII shows that comparable film properties can be obtained upon substitution of KRATON ® linear block copolymers for the Stereon ® multiblock styrene-butadiene copolymers as the compatibilizing agent.

FIG. 6 shows an overall increase in film modulus or stiffness upon increasing levels of PS in the PE/PS blend. The break in the curve indicates the composition of the two-phase system where the blend changes from PE-continuous to PS-continuous.

From FIGS. 6 and 7, it can be concluded that the proportion of PS in the HIFS/PE blend must be greater than a 40/60 composition ratio in order to develop film toughness and dispensability properties which are comparable to flexible vinyl film. Low film toughness allows the label to be easily die cut.

FIG. 8 shows the influence of Stereon ® compatibilizer level on ultimate elongation of a film with a weight ratio of 44 parts HIFS to 56 parts LDFE within the blend layer of the film. Without any compatibilizer, the film elongation values are sufficiently low to render the film brittle. At a 10 percent Stereon ® copolymer and 10 percent Elvax ® copolymer content the film exhibits comparable elongation properties to a flexible vinyl film.

What is claimed is:

1. A deformable label suitable for attachment to a selected substrate, comprising:
   a printable film facestock together with a usefully dispersed adhesive on one side of the facestock for affixing said film facestock to the substrate by means of the intervening adhesive, said film facestock including a layer of a polymer blend which comprises:
   a first material selected from the group consisting of high impact polystyrene, rubber-modified polystyrene, general purpose polystyrene, and mixtures thereof;
   a second material selected from the group consisting of linear low, ultra low density, low density and medium density polyethylene, copolymers of ethylene and propylene, of ethylene and acrylate monomers, of ethylene and vinyl acetate, and of ethylene and acrylic acid, and mixtures thereof; and a compatibilizing material;

said adhesive being selected from the group of materials characterized by the ability to form a bond with said film facestock such that the strength of the film-adhesive interface and the substrate-adhesive interface and the cohesive strength of the adhesive itself are both greater than the forces required for deformation and recovery of the film itself; and a release-coated liner material releasably bonded to said adhesive.

2. A deformable label as defined in claim 1, wherein said first material is present with said second material and said compatibilizing material in said polymer blend in an amount sufficient to realize at least a three-fold improvement in die-cuttability compared to a film of the same thickness and comprised only of said second material, and at least a two-fold improvement in the 1 percent secant modulus in the machine direction of said film composed of only said second material.

3. A deformable label as defined in claim 1, wherein said compatibilizing material in said polymer blend is selected from the group consisting of styrene-butadiene block copolymers and ethylene-vinyl acetate copolymers, and mixtures thereof.

4. A deformable label as defined in claim 1, wherein said first and second materials in said polymer blend collectively comprise at least about 60 percent by weight of said blend layer.

5. A deformable label as defined in claim 1, wherein said polymer blend further includes titanium dioxide.

6. A deformable label as defined in claim 1, wherein the facestock further comprises a first skin layer adjacent a first side of said blend layer and including a material selected from the group consisting of olefinic copolymers, modified polystyrenes, general purpose polystyrene, polypropylene and mixtures thereof.

7. A deformable label as defined in claim 6, wherein said first skin layer comprises more than about 25 percent by weight of ethylenic materials and less than about 40 percent by weight of styrenic materials.

8. A deformable label as defined in claim 6, wherein the facestock still further comprises a second skin layer adjacent a second side of said blend layer and including a material selected from the group consisting of olefinic copolymers, polypropylene, general purpose polystyrene, modified polystyrenes and mixtures thereof.

9. A deformable label as defined in claim 8, wherein said second skin layer comprises more than about 25 percent by weight of ethylenic materials and less than about 40 percent by weight of styrenic materials.

10. A deformable label as defined in claim 1, wherein the first material of the polymer blend comprises high impact polystyrene and said second material comprises low density polyethylene.

11. A deformable label as defined in claim 10, wherein said high impact polystyrene comprises from about 10 to about 40 percent by weight of said polymer blend, and said low density polyethylene comprises from about 55 to about 25 percent by weight of said polymer blend.

12. A deformable label as defined in claim 10, wherein said high impact polystyrene and said low density polyethylene are present in said polymer blend in a ratio by weight that is at least about 40 parts high impact polystyrene to about 60 parts by weight of low density polyethylene.

13. A deformable label as defined in claim 11, wherein said second material further comprises from about 4 to about 10 percent by weight of said polymer blend of low density polyethylene as a pigment carrier.

14. A deformable label on a deformable substrate, which label demonstrates improved resistance to damage from cracking, tearing, creasing, wrinkling or shrinking due to deformation of the deformable substrate to which the label is joined, comprising:

a printable film facestock together with an adhesive on one side of the facestock and positioned between the facestock and the substrate for affixing said film facestock to the substrate, said film facestock including a layer of a polymer blend which comprises:

a first material selected from the group consisting of high impact polystyrene, rubber-modified polystyrene, general purpose polystyrene, and mixtures thereof;

a second material selected from the group consisting of linear low, ultra low density, low density and medium density polyethylenes, copolymers of ethylene and propylene, of ethylene and acrylate monomers, of ethylene and vinyl acetate, and of ethylene and acrylic acid, and mixture thereof; and a compatibilizing material;

said adhesive being selected from the group of material characterized by the ability to form a bond with said composite film such that the strength of the film-adhesive interface and the substrate-adhesive interface and the cohesive strength of the adhesive itself are both greater than the forces required for deformation and recovery of the film itself.

15. A deformable label as defined in claim 14, wherein said adhesive may be further characterized as pressure sensitive.

16. A deformable label as defined in claim 14, wherein said compatibilizing material is selected from the group consisting of styrene-butadiene block copolymers and ethylene-vinyl acetate copolymers and mixtures thereof.

17. A deformable label as defined in claim 14, wherein said printable film facestock further comprises a first skin layer adjacent a first side of said blend layer and including a material selected from the group consisting of olefinic copolymers, polypropylene, modified polystyrenes, general purpose polystyrene and mixtures thereof.

18. A deformable label as defined in claim 17, wherein said printable film facestock further comprises a second skin layer adjacent a second side of said blend layer and including a material selected from the group consisting of olefinic copolymers, polypropylene, modified polystyrenes, general purpose polystyrene and mixtures thereof.

19. A deformable label on a deformable substrate as defined in claim 18, wherein said second skin layer comprises more than about 25 percent by weight of ethylenic materials and less than about 40 percent by weight of styrenic materials.

20. A deformable label on a deformable substrate as defined in claim 17, wherein said first skin layer comprises more than about 25 percent by weight of ethylenic materials and less than about 40 percent by weight of styrenic materials.

21. A deformable label as defined in claim 14, wherein said first material is present with said second material and said compatibilizing material in said polymer blend in an amount sufficient to realize at least a three-fold improvement in die-cuttability compared to a film of the same thickness and comprised only of said second material, and at least a two-fold improvement in the 1 percent secant modulus in the machine direction of said film composed of only said second material.

22. A deformable label on a deformable substrate as defined in claim 14, wherein said first and second materials in said polymer blend collectively comprise at least about 60 percent by weight of said blend layer.

23. A deformable label on a deformable substrate as defined in claim 14, wherein said polymer blend further includes titanium dioxide.

24. A deformable label on a deformable substrate as defined in claim 14, wherein the first material of the polymer blend comprises high impact polystyrene and said second material comprises low density polyethylene.

25. A deformable label on a deformable substrate as defined in claim 24, wherein said high impact polystyrene comprises from about 10 to about 40 percent by weight of said polymer blend, and said low density polyethylene comprises from about 55 to about 25 percent by weight of said polymer blend.

26. A deformable label on a deformable substrate as defined in claim 25, wherein said second material further comprises from about 4 to about 10 percent by weight of said polymer blend of low density polyethylene as a pigment carrier.

27. A deformable label on a deformable substrate as defined in claim 24, wherein said high impact polystyrene and said low density polyethylene are present in said polymer blend in a ratio by weight that is at least about 40 parts high impact polystyrene to about 60 parts by weight of low density polyethylene.

* * * * *